W. C. Allison.
Street Sweeper.
Nº 25,359.   Patented Sept. 6, 1859.
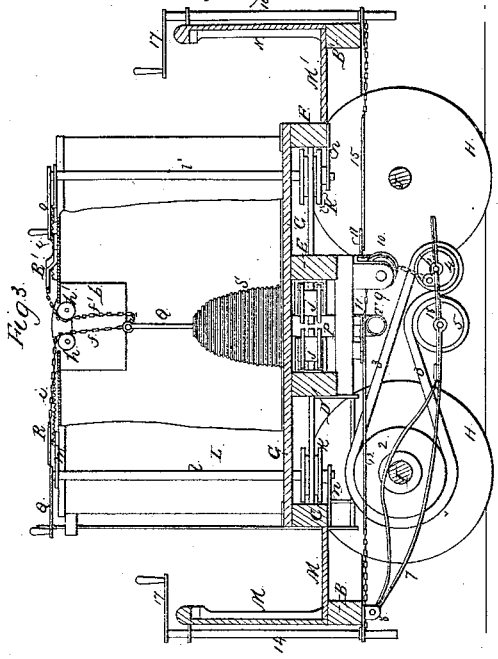
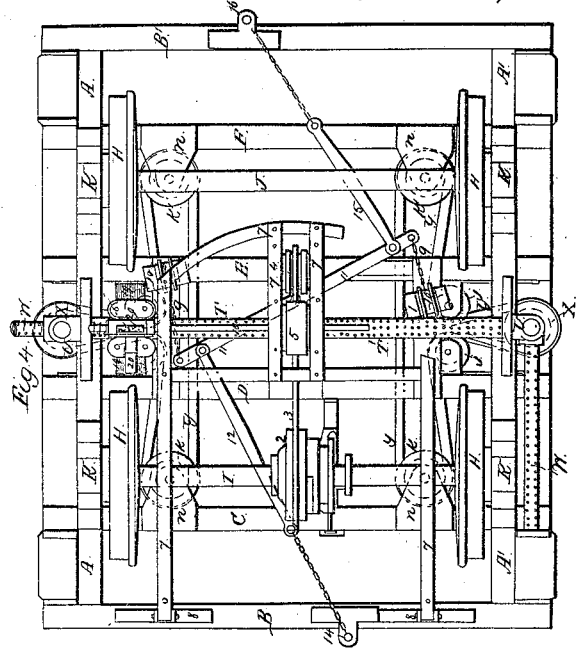
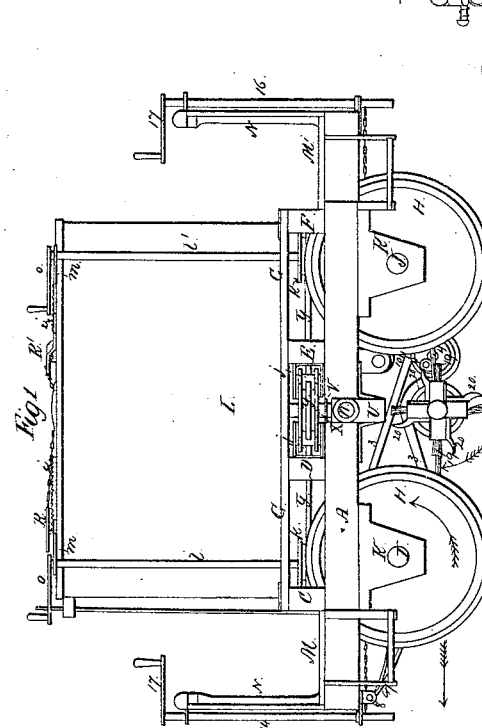
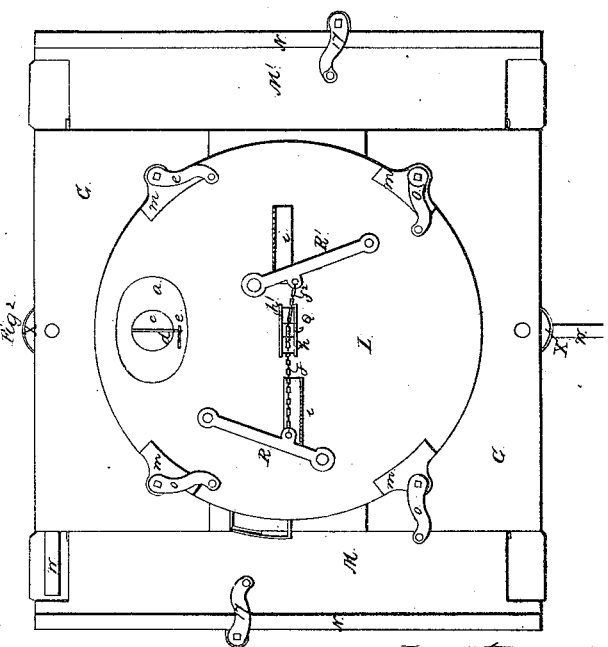
Witnesses.
Henry Howson
H. Grace Lee
Inventor
William C. Allison

UNITED STATES PATENT OFFICE.

WILLIAM C. ALLISON, OF PHILADELPHIA, PENNSYLVANIA, ASSIGNOR TO HIMSELF AND JOHN MURPHEY, OF SAME PLACE.

APPARATUS FOR WATERING AND SWEEPING RAILWAYS.

Specification of Letters Patent No. 25,359, dated September 6, 1859.

*To all whom it may concern:*

Be it known that I, WILLIAM C. ALLISON, of the city and county of Philadelphia and State of Pennsylvania, have invented a new and useful Apparatus for Watering and Sweeping Passenger Railways; and I do hereby declare the following to be a full, clear, and exact description of the same, reference being had to the accompanying drawing and to the letters of reference marked thereon.

My invention consists in certain stationary and movable perforated pipes connected to a truck having wheels adapted to a passenger railway, said truck carrying a water tank with which the pipes communicate, and the movable pipes being operated by the devices hereinafter described, or their equivalents. In combination with the truck, I employ certain revolving brushes adapted to the rails of the track, and in connection with the brushes certain projections adapted to the grooves of the rails or corners of the treads according to the construction of the rails used.

The object of my invention is to sprinkle the streets, not only between the rails, but on each side of the track with water, and to clear the rails of all obstructions, at one operation, and this without presenting any greater obstruction to the passage of ordinary vehicles than that caused by an ordinary passenger car.

In order to enable others to make and use my invention, I will now proceed to describe its construction and operation.

On reference to the accompanying drawing which forms a part of this specification, Figure 1, is a side view of my improved apparatus for watering and sweeping passenger railways. Fig. 2, a ground plan. Fig. 3, a sectional elevation. Fig. 4, an inverted plan. Figs. 5 and 6, detached sectional views showing one of the revolving brushes as applied to a rail.

Similar letters refer to similar parts throughout the several views.

The framework of the apparatus consists of the two side beams A and A′ secured together at the opposite ends by the transverse beams B and B′, and by the intermediate transverse beams C, D, E and F, which rest on the side beams and which support the platform G. The framework thus constructed is supported by the usual flanged wheels H, adapted to the rails of a passenger rail road, two of the said wheels being secured to the axle I, and two to the axle J, and the journals of the axles turning in suitable boxes in the usual hangers K, K, which are secured to the side beams A and A′.

To the platform G is secured the water tank L, and between this tank and each end of the frame is a platform M, for the driver and an attendant, the end of each platform being furnished with a dashboard N, one of which is secured to each end-beam of the frame. On the top and near one side of the tank L, is an opening large enough to allow a man to pass into the interior, when the tank has to be cleaned or repaired, and on the edge of this opening fits a cover $a$, see Fig. 2, to which is attached a vessel $b$, (Fig. 3) perforated with small holes, and projecting a short distance into the tank. In the cover $a$ is an opening large enough to admit the end of an ordinary hose pipe, and on the edge of this opening rests a cover $c$, which has a projection $d$, fitting into a catch $e$ on the cover $a$, so that by turning the cover $c$ partially around, the projection may be freed from the catch, the cover thereby becoming detached. In the bottom and in the center of the tank is an opening communicating with a vertical pipe P, and this opening is furnished with a valve attached to the spindle Q, to the top of which are attached the two chains $f$ and $f'$ the former passing over the pulley $h$, and the latter over the pulley $h'$, both pulleys being hung loosely to the edges of central oblong openings in the top of the tank through which the chains pass, one to the lever R and the other to the lever R′ (Fig. 2), to each of which one of the chains is connected. These levers are hung to pins attached to the top of the tank in such a position that one shall be within the reach of the attendant standing on either of the platforms M, thus enabling him to pull the chain, thereby raising the spindle Q and its valve, and admitting the water of the tank to the vertical pipe P.

It should be understood that each lever bears upon the edge of a plate $i$, which is furnished with notches so that a projection on the lever may rest in one or other of these notches and be thereby retained in the position to which it has been adjusted. In order to prevent any sediment or refuse substance with which the water may be impregnated, from obstructing the valve and interfering with its duty, the said valve as well as part of its spindle Q is surrounded with a protector S of wire gauze or other suitable material attached to a system of metal rings and secured to the platform G. Two horizontal perforated pipes T and T′, communicate with, and project on each side from, the vertical pipe P, the end of each pipe being secured to a metal socket U, one of which is secured to each of the side beams A and A′ of the frame. Each metal socket has a conical bore for receiving a conical plug V to which is attached a perforated pipe W closed at the outer end. Each plug which fits and operates within its socket precisely in the same manner as that of an ordinary cock, is furnished with a pulley X, around which passes an endless chain or band Y, which guided by pulleys $j, j$, passes around both the pulleys $k, k′$, the former of which is attached to the vertical shaft $l$, and the latter to the vertical shaft $l′$, each shaft turning at the top in a projection $m$ on the tank L, and at the bottom in a bracket $n$, attached to one of the transverse beams of the frame, and the shafts being so situated as to allow the attendant standing on either of the platforms M to operate the endless chain Y, by turning one or other of the handles $o$, on moving which the pulley X, may be partially turned, and the pipe W consequently made to project at right angles to the frame, or take a position parallel with the latter, at pleasure. The plug at the end of the horizontal perforated pipe W at the opposite side of the frame, is furnished with a pulley X, operated by an endless chain, in connection with vertical shafts $l$ and $l′$, in a precisely similar manner to that above described. It should be understood however that the movable perforated pipes W, at the opposite side of the frames, are operated entirely independently of each other, and that the sockets and plugs above alluded to are furnished with such passages that the water cannot have free access to the said movable pipes excepting when the latter projects outward from the frame.

To the axle I is secured a pulley 2, around which passes the endless chain or band 3, which also passes around the pulley 4, and over the pulley 5. The former is attached to a spindle which turns freely in the frame 7, the latter in the present instance being composed of a series of bars of wrought iron hung to the brackets 8, on the under side of the end beam B of the main frame. The outer end of this frame 7, is supported by chains or cords 9, one of which is attached to each corner, as seen in Fig. 4, each chain passing over a pulley 10 which runs loose on a stationary pin, and one chain being attached to one end and the other to the other end of the diagonal lever 11, which has its fulcrum on a central stationary pin attached to the under side of the main frame. Near one end of this lever is jointed a rod 12, connected by a chain to a vertical shaft 14, and near the opposite end of the same lever is jointed a similar rod 15 connected by a chain to a similar vertical shaft 16. One of these vertical shafts is hung to one dashboard N of the frame, and the other to the other dashboard N, and both shafts are furnished with handles 17, so that the attendant or driver can raise and lower the frame 7, while standing on either platform.

The pulley 5, previously alluded to, is secured to a shaft 18 which turns in the opposite sides of the swing frame 7 and to each end of the shaft is secured a revolving brush 19, each brush being situated between the two wheels and directly above one of the rails of the track. The revolving brush, as illustrated in the drawing, consists of four arms, to each of which is confined a mass of thin whalebone strips, which clear the tread of the rails, and near the brushes are secured any convenient number of projections 20, which are of such a length and so situated, that while the brushes sweep the rails, the projections remove all obstructions which collect in the grooves of the rails as seen in Fig. 5. In some passenger railways the rails consist of a simple tread raised above the flange which forms the tramway, in which case the projections 20 are arranged to operate in the corner of the tread for the purpose of removing any obstructions which may collect there, as seen in Fig. 6.

The tank is in the first instance filled with water by means of a pipe connected to any of the street plugs, the end of the pipe being inserted into the opening in the cover $a$, the water passing first into the vessel $b$, of the cover, which receives the greater portion of the refuse matter while the water passes through the perforations into the tank. After the latter has been filled the cover $c$ of the opening is replaced and the driver with an attendant taking his place on one of the platforms, turns one of the handles $o$, so that the perforated pipes W, on both sides of the apparatus may project at right-angles. As the driver starts the horses attached to the apparatus he or the attendant moves one of the levers R or R′, thereby allowing the water of the tank to pass into the vertical pipe P, thence into the perforated pipes T and T′, and thence into the perforated pipes W, W. The water passing in the form of minute streams from the pipes T and T′, will sprinkle the ground between the rails of the track while the water from the swing pipes W, W, sprinkles the street on each side of the track to a width corresponding to the length of the pipes. When the apparatus has to pass a vehicle, the driver or attendant operates the nearest handle $o$, so as to turn the swing pipes W, out of the way of the vehicle, and after the latter has been passed the swing pipe is moved out as before, and the sprinkling, which during the passage of the vehicle had been discontinued, proceeds as before.

It will now be seen without further description that by the above described apparatus the whole width of a street in which the track of a passenger railway is laid may be sprinkled without any more interruption to the travel of ordinary vehicles than that caused by a passenger car.

Should it be necessary to stop the machine the driver or attendant by moving one of the levers R or R′, allows the valve on the spindle Q, to drop, and thus cuts off the passage of the water to the perforated pipes.

Simultaneously with the sprinkling of the street as the car is drawn over the track, the revolving brushes acting on the rails will clear them of all refuse and dust dampened by the water, while the revolving projections 20 remove all obstructions collected in the grooves, if a grooved rail is used, or in the corner of the tread if an ordinary flanged rail is used on the track.

By operating either of the handles (17) the swing frame 7 may be raised or lowered at pleasure.

The object of the double set of levers R, handles o, and 17, is to enable the driver and his attendant to admit the water, to or cut it off from the perforated pipes, to operate the movable pipes T and T′, and to raise and lower the swing frame and brushes from either end of the apparatus, as the driver sometimes stands on one platform M, and sometimes on the other according to the direction in which the apparatus is drawn over the track.

I wish it to be understood that I lay no separate claim to brushes hung to and caused to revolve simultaneously with the movement of a vehicle as such a device has been used in common road sweeping machines. But

I claim as my invention and desire to secure by Letters Patent,—

1. The horizontal perforated pipes T and T′, and the swing pipes W, in combination with a truck having wheels adaptetd to the rails of a passenger railway, the said truck carrying a tank L, and the said swing pipes being arranged and operated by the devices herein described, or their equivalents, substantially in the manner and for the purpose herein set forth.

2. The combination of the adjustable revolving brushes 19, with the truck, when the brushes are arranged in respect to the rails substantially as and for the purpose specified.

3. I claim in combination with the brushes any convenient number of projections 20 revolving simultaneously with the said brushes and so arranged in respect to the rails as to clean the grooves or corners of the treads from all obstructions.

In testimony whereof, I have signed my name to this specification in the presence of two subscribing witnesses.

WILLIAM C. ALLISON.

Witnesses:
WM. McGOWAN,
L. I. PIERS.